US012657930B2

(12) United States Patent
Arata et al.

(10) Patent No.: US 12,657,930 B2
(45) Date of Patent: Jun. 16, 2026

(54) INFORMATION PROCESSING DEVICE, VEHICLE, ROADSIDE UNIT, AND INFORMATION PROCESSING METHOD

(71) Applicant: KYOCERA Corporation, Kyoto (JP)

(72) Inventors: Koji Arata, Yokohama (JP); Shigeto Hattori, Yokohama (JP); Ryuichi Sawada, Kawasaki (JP); Hironobu Tanigawa, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 259 days.

(21) Appl. No.: 18/552,156

(22) PCT Filed: Mar. 18, 2022

(86) PCT No.: PCT/JP2022/012917

§ 371 (c)(1),
(2) Date: Sep. 22, 2023

(87) PCT Pub. No.: WO2022/210062

PCT Pub. Date: Oct. 6, 2022

(65) Prior Publication Data

US 2024/0185615 A1      Jun. 6, 2024

(30) Foreign Application Priority Data

Mar. 29, 2021      (JP) ................................. 2021-055764

(51) Int. Cl.
*G06V 20/58*      (2022.01)
*G06V 10/25*      (2022.01)
*G06V 10/60*      (2022.01)

(52) U.S. Cl.
CPC ................................... *G06V 20/58* (2022.01)

(58) Field of Classification Search
CPC ........ G06V 20/58; G06V 10/25; G06V 10/60; G06V 10/763; G06V 2201/07;
(Continued)

(56) References Cited

U.S. PATENT DOCUMENTS

| 10,535,264 | B2 | 1/2020 | Takaki | |
| 2011/0050482 | A1* | 3/2011 | Nanami | ................ G01S 13/867 |
| | | | | 342/146 |

(Continued)

FOREIGN PATENT DOCUMENTS

| CN | 107103276 A | 8/2017 |
| CN | 109073778 A | 12/2018 |

(Continued)

*Primary Examiner* — Jennifer Mehmood
*Assistant Examiner* — Dustin Bilodeau
(74) *Attorney, Agent, or Firm* — Studebaker Brackett PLLC

(57)      ABSTRACT

An information processing device includes an image interface, a sensor interface, and a controller. The image interface acquires a captured image from an imaging device. The sensor interface acquires a distance distribution from a distance measurement sensor that has a detection range that overlaps at least partially with the imaging range of the imaging device. The distance measurement sensor measures a distance distribution by receiving a reflected wave of a projected wave at an object. The distance distribution includes distance values to a reflection point in each of a plurality of directions. The controller detects a subject image from the captured image, and calculates the position of a subject, which corresponds to the subject image, in the width direction based on the captured image and the distance distribution. The width direction is parallel to the horizontal direction and perpendicular to the optical axis direction of the imaging device.

16 Claims, 6 Drawing Sheets

(58) Field of Classification Search
CPC ........ G01S 7/003; G01S 15/931; G01S 15/88;
G01S 17/88; G01S 2013/9316; G01S
2013/9323; G01S 2013/9324; G01S
13/867; G01S 13/91; G01S 13/931; G01S
15/86; G01S 17/86; G01S 17/931; G08G
1/166; G08G 1/16
USPC .......................................................... 382/104
See application file for complete search history.

(56)              References Cited

U.S. PATENT DOCUMENTS

| | | | |
|---|---|---|---|
| 2016/0307026 A1 | 10/2016 | Nishijima | |
| 2017/0242117 A1* | 8/2017 | Izzat ....................... | G01S 17/66 |
| 2019/0130752 A1* | 5/2019 | Takaki ..................... | B60T 7/12 |

FOREIGN PATENT DOCUMENTS

| | | | |
|---|---|---|---|
| DE | 11 2017 002 120 T5 | 1/2019 | |
| EP | 3 208 635 B1 | 1/2019 | |
| JP | H08-329393 A | 12/1996 | |
| JP | 2000-329852 A | 11/2000 | |
| JP | 2009-098025 A | 5/2009 | |
| JP | 2016-206773 A | 12/2016 | |

* cited by examiner

FIG. 1

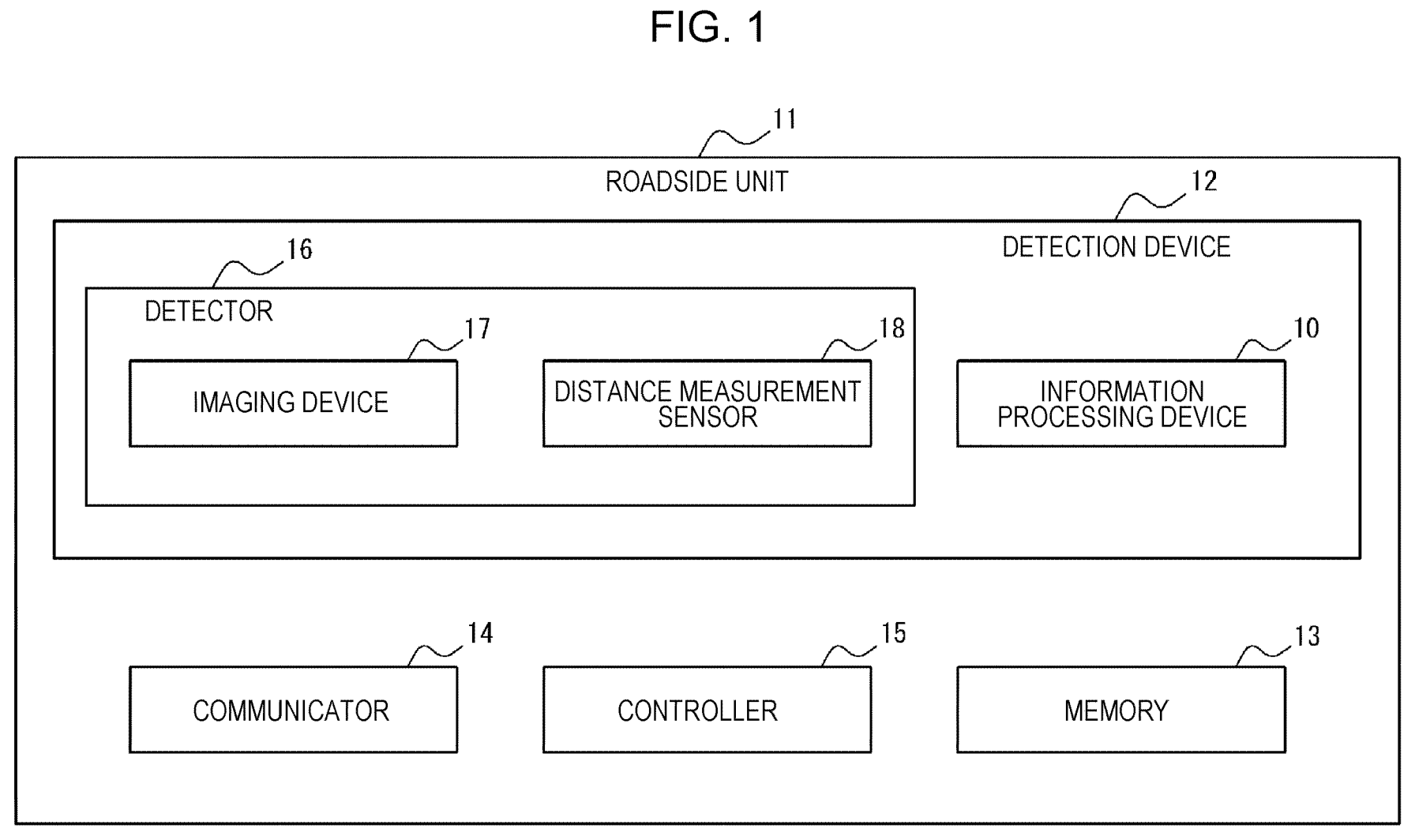

ROADSIDE UNIT 11

DETECTION DEVICE 12

DETECTOR 16

IMAGING DEVICE 17

DISTANCE MEASUREMENT SENSOR 18

INFORMATION PROCESSING DEVICE 10

MEMORY 13

CONTROLLER 15

COMMUNICATOR 14

FIRST DIRECTION

SECOND DIRECTION

FIG. 5

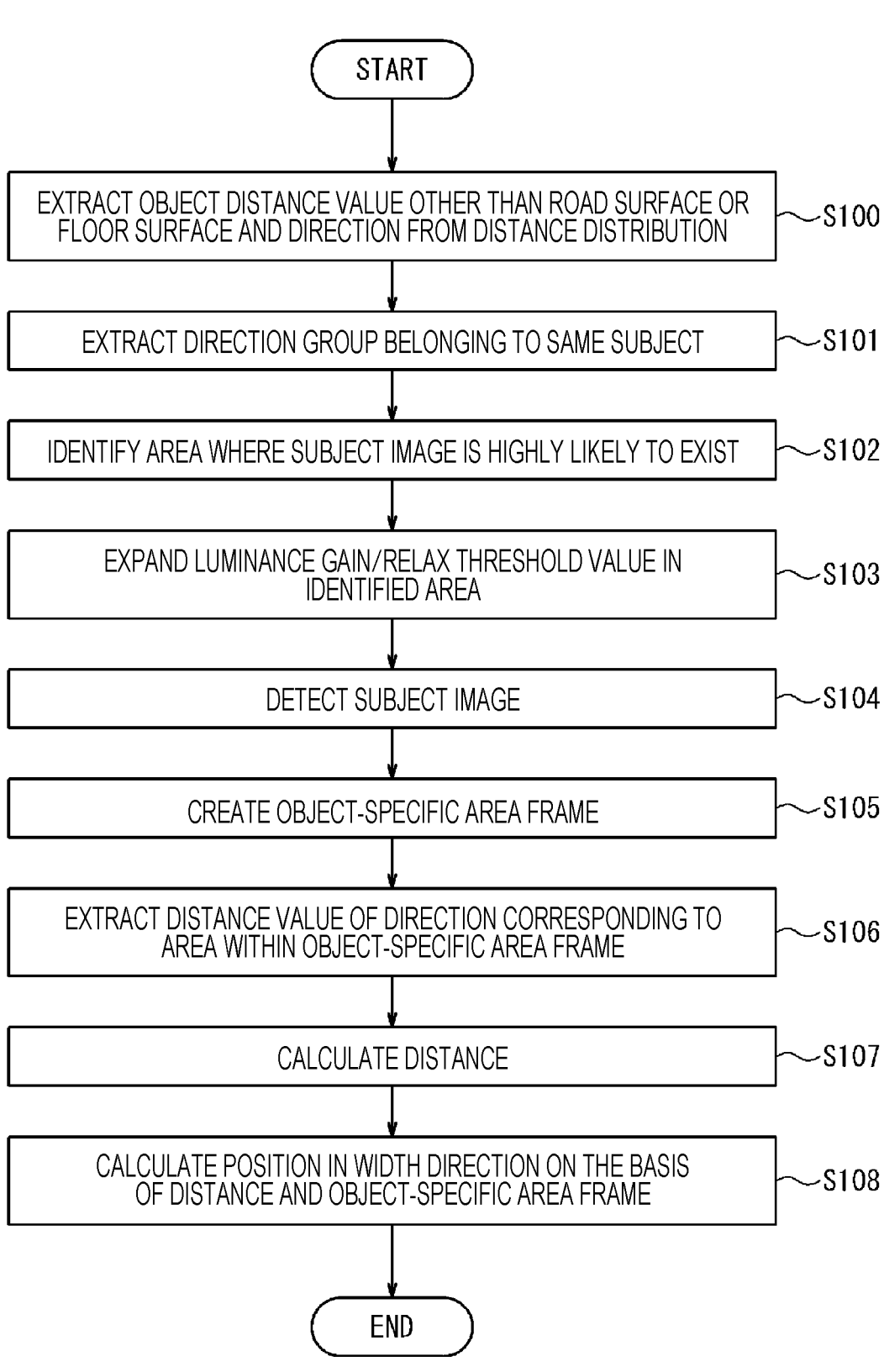

START

EXTRACT OBJECT DISTANCE VALUE OTHER THAN ROAD SURFACE OR FLOOR SURFACE AND DIRECTION FROM DISTANCE DISTRIBUTION — S100

EXTRACT DIRECTION GROUP BELONGING TO SAME SUBJECT — S101

IDENTIFY AREA WHERE SUBJECT IMAGE IS HIGHLY LIKELY TO EXIST — S102

EXPAND LUMINANCE GAIN/RELAX THRESHOLD VALUE IN IDENTIFIED AREA — S103

DETECT SUBJECT IMAGE — S104

CREATE OBJECT-SPECIFIC AREA FRAME — S105

EXTRACT DISTANCE VALUE OF DIRECTION CORRESPONDING TO AREA WITHIN OBJECT-SPECIFIC AREA FRAME — S106

CALCULATE DISTANCE — S107

CALCULATE POSITION IN WIDTH DIRECTION ON THE BASIS OF DISTANCE AND OBJECT-SPECIFIC AREA FRAME — S108

END

INFORMATION PROCESSING DEVICE, VEHICLE, ROADSIDE UNIT, AND INFORMATION PROCESSING METHOD

CROSS-REFERENCE TO RELATED APPLICATIONS

This application claims priority based on Japanese Patent Application No. 2021-055764 filed Mar. 29, 2021, the entire disclosure of which is hereby incorporated by reference.

TECHNICAL FIELD

The present disclosure relates to an information processing device, a vehicle, a roadside unit, and an information processing method.

BACKGROUND OF INVENTION

Detecting the position of a specific type of subject in a real space is desirable for applications such as vehicle driver assistance and outdoor surveillance. To detect position with high accuracy, one proposal performs position detection using an image at short-distance range and performs position detection using a millimeter-wave radar at long-distance range (see Patent Literature 1).

CITATION LIST

Patent Literature

Patent Literature 1: Japanese Unexamined Patent Application Publication No. 2016-206773

SUMMARY

To address the problems described above, in one aspect, an information processing device includes:

an image interface configured to acquire a captured image from an imaging device;

a sensor interface configured to acquire a distance distribution from a distance measurement sensor which has a detection range overlapping at least partially with an imaging range of the imaging device and which is configured to measure the distance distribution including distance values to a reflection point in each of a plurality of directions by receiving a reflected wave of a projected wave at an object; and a controller configured to detect a target, namely a subject image, from the captured image, and calculate, on the basis of the captured image and the distance distribution, a position of a subject corresponding to the subject image in a width direction which is parallel to a horizontal direction and perpendicular to an optical axis direction of the imaging device.

In a second aspect, a moving body includes:

an imaging device configured to generate a captured image;

a distance measurement sensor which has a detection range overlapping at least partially with an imaging range of the imaging device and which is configured to generate a distance distribution including distance values to a reflection point in each of a plurality of directions by receiving a reflected wave of a projected wave at an object; and a controller configured to detect a target, namely a subject image, from the captured image, and calculate, on the basis of the captured image and the distance distribution, a position of a subject corresponding to the subject image in a width direction which is parallel to a horizontal direction and perpendicular to an optical axis direction of the imaging device.

In a third aspect, a roadside unit includes:

an imaging device configured to generate a captured image;

a distance measurement sensor which has a detection range overlapping at least partially with an imaging range of the imaging device and which is configured to generate a distance distribution including distance values to a reflection point in each of a plurality of directions by receiving a reflected wave of a projected wave at an object; and a controller configured to detect a target, namely a subject image, from the captured image, and calculate, on the basis of the captured image and the distance distribution, a position of a subject corresponding to the subject image in a width direction which is parallel to a horizontal direction and perpendicular to an optical axis direction of the imaging device.

In a fourth aspect, an information processing method includes:

generating a captured image;

generating a distance distribution including distance values to a reflection point in each of a plurality of directions by receiving a reflected wave of a projected wave at an object in a detection range that overlaps at least partially with a range of the captured image;

detecting a target, namely a subject image, from the captured image; and calculating, on the basis of the captured image and the distance distribution, a position of a subject corresponding to the subject image in a width direction which is parallel to a horizontal direction and perpendicular to an optical axis direction of the imaging device.

BRIEF DESCRIPTION OF THE DRAWINGS

FIG. 1 is a block diagram illustrating a schematic configuration of a roadside unit including an information processing device according to the present embodiment.

FIG. 5 is a flowchart for explaining a position calculation process to be executed by the controller in FIG. 2.

DESCRIPTION OF EMBODIMENTS

Figure 2:
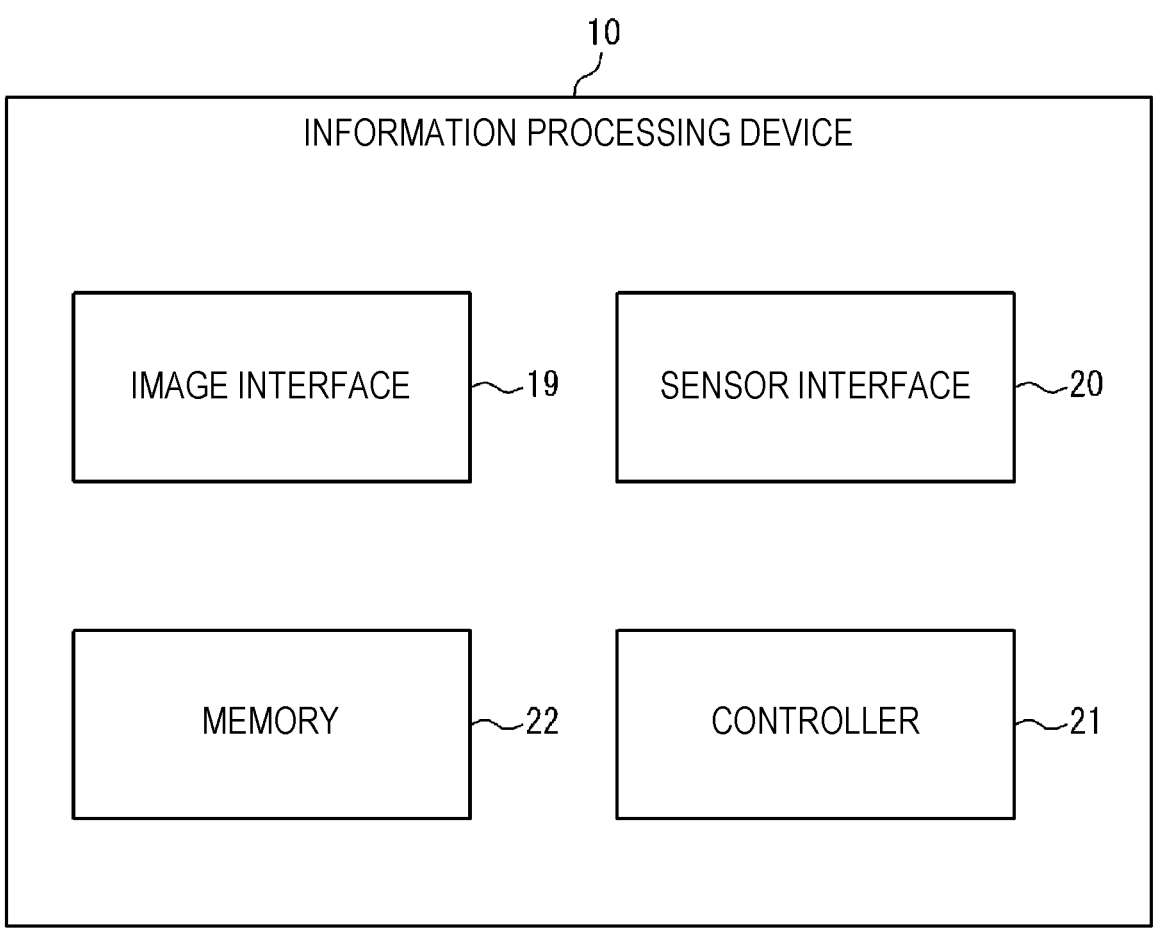
FIG. 2 is a block diagram illustrating a schematic configuration of the information processing device in FIG. 1.

The following refers to the drawings to describe an embodiment of an information processing device to which the present disclosure is applied.

As illustrated in FIG. 1, in one embodiment of the present disclosure, a roadside unit 11 includes an information processing device 10. The roadside unit 11 may include a detection device 12, a memory 13, a communicator 14, and a controller 15.

The detection device 12 may detect a wave propagating from the vicinity of the roadside unit 11. The detection device 12 may detect the presence position of a subject in a real space on the basis of the detected wave. The subject is a measurement target in the surroundings of the roadside unit 11. The presence position is a position in a world coordinate system, for example. In the present embodiment, the measurement target is a person, a box-shaped vehicle, a motorcycle, and a bicycle, for example. The memory 13 may store the position of the roadside unit 11. The communicator 14 may communicate with external equipment in a wired or wireless way. For example, the external equipment is a terminal device such as a navigation device used in a vehicle that approaches the roadside unit 11, or a server device that recognizes the current position of a traveling vehicle and transmits traffic information to the vehicle. The external equipment may be a terminal device used for manual calibration of the detection device 12. The controller 15 may control the communicator 14 to transmit the type of measurement target and the presence position of the measurement target in the real space, together with the position of the roadside unit 11, to external equipment that is to notify the user.

The following describes details of the detection device 12. The detection device 12 may include a detector 16 and the information processing device 10.

The detector 16 may include an imaging device 17 and a distance measurement sensor 18. The detector 16 may have a predefined detector coordinate system. The detector coordinate system is a three-dimensional coordinate system having an origin located at any position in the detector 16, with three mutually perpendicular axes passing through the origin as coordinate axes. The origin of the detector coordinate system is at the intersection point between an optical axis and an image sensor of the imaging device 17, for example. The detector coordinate system includes a line parallel to the optical axis of the imaging device 17 as a coordinate axis, for example.

The detector 16 may be secured to a structure with height allowing for imaging of an outdoor scene that includes a road surface. The structure may be a signal device, a utility pole, or a streetlight, for example. The position and orientation of the detector 16 with respect to the structure may be fixed in advance. The position of the detector 16 means the origin of the detector coordinate system relative to a reference position in the world coordinate system. The orientation of the detector 16 means the tilt of the coordinate axes of the detector coordinate system relative to the coordinate axes of the world coordinate system. In the present disclosure, the "world coordinate system" means a coordinate system set on the basis of a three-dimensional space outside the detector 16.

The imaging device 17 generates a captured image by detecting electromagnetic waves propagating from a plurality of object points. The imaging device 17 may generate the captured image at a certain frame rate such as 30 fps. The imaging device 17 may be capable of detecting at least one of visible light, near-infrared light, or far-infrared light. In other words, the imaging device 17 may be a visible light camera capable of generating a visible light image, or an infrared camera capable of generating a near-infrared image or a far-infrared image.

The imaging device 17 may be fixed at a predetermined position in the detector coordinate system. The imaging device 17 may be fixed in an orientation facing a predetermined direction in the detector coordinate system.

The distance measurement sensor 18 emits a projected wave and measures a distance value to a reflection point on an object irradiated by the projected wave. The distance measurement sensor 18 measures the distance value on the basis of the time from the emission time of the projected wave to the reception time of a reflected wave at the object. The distance measurement sensor 18 generates a distance distribution that includes a distance value for each direction in which a reflected wave is generated. The distance measurement sensor 18 may generate the distance distribution on a certain cycle. Preferably, the cycle for generating the distance distribution has little or no difference from the inverse of the frame rate of the imaging device 17.

The projected wave may include at least one of a radio wave, a sound wave, or a light wave, for example. In other words, the distance distribution may include a detection result from at least one of radar, sonar, or LiDAR. In the present embodiment, the distance measurement sensor 18 is a millimeter-wave radar.

The distance measurement sensor 18 may have a detection axis. The detection axis may be a line passing through the source of the projected wave and parallel to any direction of travel within a projection range of the projected wave. The distance measurement sensor 18 may define two lines parallel to a plane perpendicular to the detection axis as axes, and detect a distance value from a reflection point in each direction inclined from the defined axes.

The distance measurement sensor 18 may be fixed at a predetermined position in the detector coordinate system. The distance measurement sensor 18 may be fixed in an orientation facing a predetermined direction in the detector coordinate system. For example, the distance measurement sensor 18 may be fixed at a position and in an orientation such that the detection range overlaps at least partially with the imaging device 17. For example, the distance measurement sensor 18 may be fixed at a position and in an orientation such that the optical axis of the imaging device 17 and the detection axis of the distance measurement sensor 18 are parallel and close to each other.

As illustrated in FIG. 2, the information processing device 10 includes an image interface 19, a sensor interface 20, and a controller 21. The information processing device 10 may further include a memory 22.

The image interface 19 acquires a captured image from the imaging device 17. The sensor interface 20 acquires a distance distribution from the distance measurement sensor 18.

The memory 22 includes a storage device of any kind, such as random access memory (RAM) and read-only memory (ROM), for example. The memory 22 may store various programs for causing the controller 21 to exhibit functionality and various information to be used by the controller 21.

The memory 22 may store a correspondence between the position of each pixel in a captured image and each direction corresponding to a distance value in a distance distribution. The correspondence between the position of each pixel and each direction may be calculated on the basis of the position and orientation of each of the imaging device 17 and distance measurement sensor 18 in the detector coordinate system.

The memory 22 may store a distance value from the distance measurement sensor 18 to the road surface or floor surface in each direction from the distance measurement sensor 18. The distance value from the distance measurement sensor 18 to the road surface may be sampled by securing the detector 16 to a structure and causing the detector 16 to detect the distance to the distance measurement sensor 18 in a state with nothing present on the road surface or floor surface. The state of being on the road surface or floor surface may mean the state of being in contact with the road surface or floor surface.

The memory 22 may store a conversion formula or conversion table for converting from distance values and corresponding directions in the distance distribution acquired from the distance measurement sensor 18 to a coordinate position in the world coordinate system. The conversion formula or conversion table may be based on the position and orientation of the detector 16 relative to the structure, and the position and orientation of the distance measurement sensor 18 in the detector 16. The world coordinate system may have the vertical direction in the real space and two mutually perpendicular directions parallel to the horizontal plane as axes.

The memory 22 may store a conversion formula or conversion table for the case in which a pixel in a captured image acquired from the imaging device 17 indicates an object on the road surface or floor surface. In this case, the conversion formula or conversion table is used to convert from coordinates in a two-dimensional coordinate system of the pixel to coordinates in the world coordinate system.

The controller 21 includes at least one processor and a memory. The processor may include a general-purpose processor that loads a specific program to execute a specific function, and a special-purpose processor dedicated to a specific process. The special-purpose processor may include an application-specific integrated circuit (ASIC). The processor may include a programmable logic device (PLD). The PLD may include a field-programmable gate array (FPGA). The controller 21 may also be a system-on-a-chip (SoC) or a system in a package (SiP) in which one or more processors cooperate.

The controller 21 may extract a distance value different from the distance value to the road surface or floor surface, together with a corresponding direction, from a distance distribution acquired from the distance measurement sensor 18.

The controller 21 detects a subject image corresponding to a subject, that is, a measurement target, from a captured image. More specifically, the controller 21 detects a subject image within a range of overlap between the imaging range of the imaging device 17 and the detection range of the distance measurement sensor 18. The controller 21 may detect a subject image according to a known method such as pattern matching or deep learning. The controller 21 may use a distance distribution as described below to detect a subject image.

The controller 21 may identify an area in the captured image where a subject image is highly likely to exist, on the basis of a distance distribution acquired from the distance measurement sensor 18 or the extracted distance distribution described above. More specifically, the controller 21 may extract at least one distance value group from a plurality of direction-specific distance values in the distance distribution. In an extracted distance value group, the distance values differ by a predetermined value or less and the corresponding directions are close to each other. The distance values differing by a predetermined value or less means that, for example, the difference between the maximum and minimum values in the distance value group is a predetermined value or less, or the difference between two distance values corresponding to two adjacent directions is a predetermined value or less. For each direction group corresponding to an extracted distance value group, the controller 21 may identify an area including at least the corresponding area in the captured image as an area where a subject image is highly likely to exist for that direction group.

In the extraction of a direction group, the controller 21 may include a direction for which the angle with the direction closest to any direction is less than an outer edge threshold value in the direction group that the closest direction belongs to. The outer edge threshold value is a threshold value for comparing the angle between the directions corresponding to two reflection points to determine if an outer edge of a single subject image exists between the two reflection points. The outer edge threshold value may be set to decrease with increasing distance from the distance measurement sensor 18 to the road surface or floor surface.

The controller 21 may expand the luminance gain of a captured image and/or relax a threshold value to be used to detect a subject image in an area where a subject image is highly likely to exist. In one example, the threshold value is compared to a degree of difference from, or similarity to, a stored pattern in pattern matching. In another example, the threshold value is compared to a confidence level of subject estimation based on deep learning. The controller 21 may detect a subject image from a captured image with an expanded luminance gain and/or a relaxed threshold value.

Figure 3:
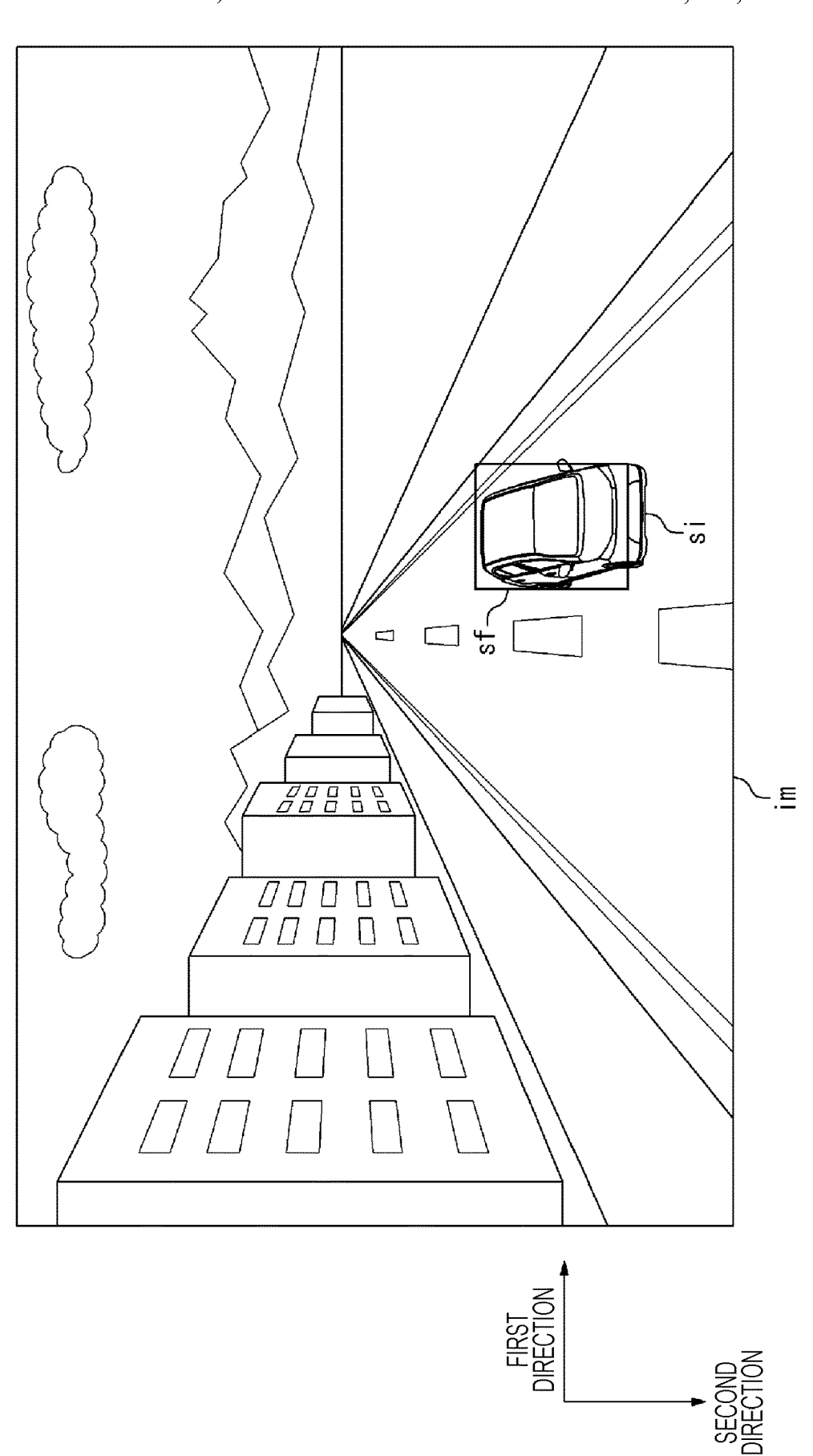
FIG. 3 illustrates a captured image indicating a subject image detected by the controller in FIG. 2 and an object-specific area frame.

The controller 21 may create an object-specific area frame surrounding a subject image for each subject image detected in a captured image. As illustrated in FIG. 3, an object-specific area frame sf is a rectangular frame enclosing two lines parallel to a second direction and touching both ends, in a first direction, of a subject image si in a captured image im and two lines parallel to the first direction and touching both ends, in the second direction, of the subject image si. The first direction is the direction in the captured image that corresponds to the width direction parallel to the horizontal direction and perpendicular to the optical axis direction in the real space. The second direction is the direction in the captured image that corresponds to vertically downward in the real space. The second direction is perpendicular to the first direction.

Note that in the case where the subject is a vehicle or the like, the vertical downward edge of the subject image si may be indistinct in situations with dark surroundings, such as at night, and under adverse weather conditions, such as in the rain, for example. Therefore, error may occur in the lines on the second-direction side of the object-specific area frame sf.

The controller 21 may calculate the distance to a subject corresponding to the detected subject image si on the basis of the captured image im and/or a distance distribution.

The controller 21 may be capable of calculating the distance on the basis of only the captured image im. Specifically, the controller 21 may be capable of calculating the distance by treating the lines on the second-direction side of the object-specific area frame sf in the captured image im as the position where the corresponding subject exists on the road surface in the real space, and converting the coordinates of the lines to coordinates in the world coordinate system.

The controller 21 may be capable of calculating the distance of a subject by extracting a distance value for the extracted direction group described above on the basis of a distance distribution. Note that the controller 21 may be capable of calculating the distance by averaging the distance value group corresponding to a direction group. The controller 21 may be capable of calculating the distance by averaging a certain percentage of distance values, such as 10% from the minimum value side, in the distance value group.

The controller 21 may use the captured image im in distance calculation based on a distance distribution. Specifically, the controller 21 may extract, from a distance distribution, a distance value group that corresponds to a direction group corresponding to the area inside the object-specific area frame sf. The controller 21 may use the extracted distance value group to calculate the distance to a subject. For example, the controller 21 may calculate the distance by averaging a plurality of extracted distance value groups. The controller 21 may calculate the distance by averaging a certain percentage of distances from the minimum value side in a plurality of extracted distance value groups.

The controller 21 may finally calculate the distance of a subject using a distance calculated on the basis of only the object-specific area frame sf and a distance calculated on the basis of a distance distribution. For example, the controller 21 may apply to the final calculation a weighted average of the distance calculated on the basis of only the object-specific area frame sf and the distance calculated on the basis of the distance distribution.

The controller 21 may prioritize use of a distance distribution to calculate the distance to a subject. For example, the controller 21 may prioritize use of a distance distribution by increasing the weighting applied to the distance calculated on the basis of the distance distribution. The controller 21 may change the relative priority, or in other words the weighting, of a distance distribution to be used to calculate the distance to a subject according to the luminance of the captured image im.

The controller 21 calculates the position, in the width direction, of a subject corresponding to the detected subject image si on the basis of the captured image im and a distance distribution. Specifically, the controller 21 may calculate the position of a subject in the width direction on the basis of the object-specific area frame sf and the distance of the subject. The following describes a more specific method of calculating the position in the width direction.

Figure 4:
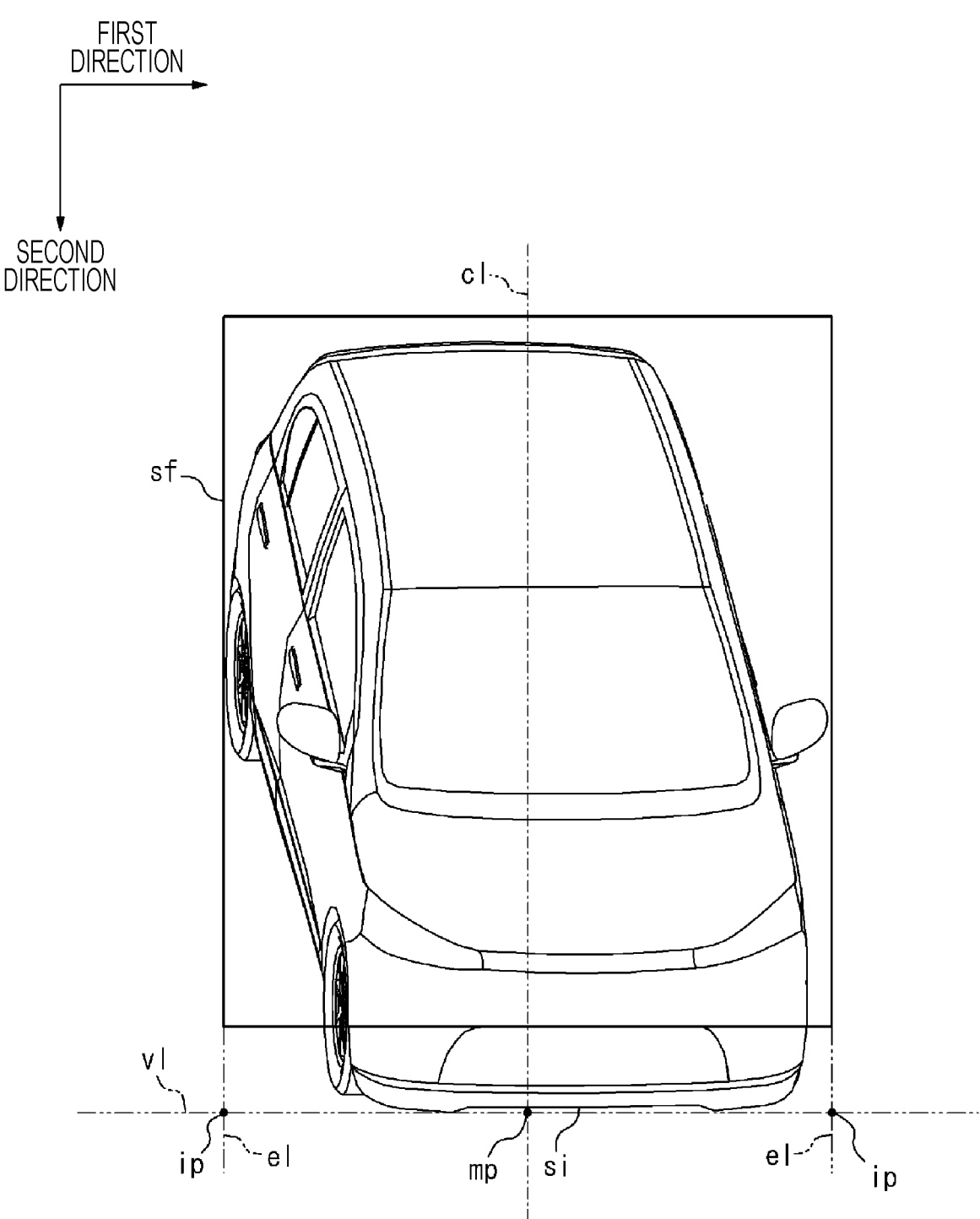
FIG. 4 is an enlarged view of the subject image and object-specific area frame in FIG. 3.

The controller 21 may use the distance of a subject calculated on the basis of a distance distribution and the direction corresponding to the distance as a basis for calculating the position of the subject corresponding to the direction on the road surface in the world coordinate system. The controller 21 may calculate the position of a second direction in the captured image im that corresponds to the position of the subject on the road surface in the world coordinate system. As illustrated in FIG. 4, the controller 21 may calculate the position coordinates of two intersection points ip. The intersection points ip are the points where a virtual line vl extending in the first direction at the calculated position in the second direction intersects with extension lines of each of the two lines of the object-specific area frame sf extending in the second direction. The controller 21 may calculate the position coordinates of a midpoint mp between the two intersection points ip. The controller 21 may calculate position coordinates in the world coordinate system that correspond to the position coordinates of the midpoint mp. The controller 21 may calculate the position of the subject in the width direction by calculating position coordinates in the world coordinate system.

Next, the flowchart in FIG. 5 will be used to describe a position calculation process to be executed by the controller 21 in the present embodiment. The position calculation process starts when the most recent captured image im and distance distribution are each acquired.

In step S100, the controller 21 extracts a distance value different from the distance value to the road surface or floor surface, together with a corresponding direction, from the acquired distance distribution. After extraction, the process proceeds to step S101.

In step S101, the controller 21 extracts a direction group belonging to the same subject from among a plurality of direction-specific distance values in the acquired distance distribution. Specifically, the controller 21 extracts, as the direction group belonging to the same subject, a direction group corresponding to a distance value group from among the plurality of direction-specific distance values. The distance value group contains distance values that differ by a predetermined value or less and have directions that are close to each other. After extraction, the process proceeds to step S102.

In step S102, the controller 21 identifies an area in the captured image im corresponding to the direction group extracted in step S101 as an area where the subject image si is highly likely to exist. After identification, the process proceeds to step S103.

In step S103, the controller 21 expands the luminance gain of the captured image im and relaxes the threshold value to be used to detect the subject image si in the identified area. After the luminance gain expansion and threshold value relaxation, the process proceeds to step S104.

In step S104, the controller 21 detects the subject image si from the acquired captured image im. After detection, the process proceeds to step S105.

In step S105, the controller 21 creates an object-specific area frame sf to separately surround each subject image si detected in step S104. After creation, the process proceeds to step S106.

In step S106, the controller 21 extracts, from the acquired distance distribution, distance values in the direction corresponding to the area inside the object-specific area frame sf. After extraction, the process proceeds to step S107.

In step S107, the controller 21 calculates the distance of a subject on the basis of the distance values extracted in step S106. After calculation, the process proceeds to step S108.

In step S108, the controller 21 calculates the position of the subject in the width direction on the basis of the object-specific area frame sf created in step S105 and the distance of the subject calculated in step S107. After calculation, the position calculation process ends.

The information processing device 10 according to the present embodiment configured as above detects a target, namely the subject image si, from the captured image im. The information processing device 10 calculates, on the basis of the captured image im and a distance distribution, the position of a subject corresponding to the subject image si in the width direction which is parallel to the horizontal direction and perpendicular to the optical axis direction of the imaging device 17. According to such a configuration, the information processing device 10 uses distance with high detection accuracy based on the distance distribution. Therefore, the information processing device 10 may have improved accuracy in the detection of the position of the subject in the width direction based on the captured image im. Consequently, the information processing device 10 may have improved detection accuracy in position detection.

The information processing device 10 according to the present embodiment prioritizes use of a distance distribution to calculate the distance to a subject. According to such a configuration, the information processing device 10 calculates the distance to a subject by prioritizing the distance distribution, which is of higher detection accuracy than the captured image im. Therefore, the information processing device 10 may have improved distance detection accuracy compared to distance detection using only the captured image im.

The information processing device 10 according to the present embodiment changes the relative priority of a distance distribution to be used to calculate the distance to a subject according to the luminance of the captured image im. In distance detection using only the captured image im, the luminance of the captured image im influences the detection accuracy. In response to such a phenomenon, the information processing device 10 with the configuration described above changes the relative priority of a distance distribution in a situation of degraded detection accuracy for distance detection using only the captured image im. Therefore, the information processing device 10 may have improved distance detection accuracy.

The information processing device 10 according to the present embodiment identifies an area where the subject image si is highly likely to exist in the captured image im on the basis of a distance distribution. The information processing device 10 detects the subject image si from the captured image im after executing at least one of expanding the luminance gain of the captured image im or relaxing a threshold value to be used to detect the subject image si in the identified area. Detection of the subject image si in the captured image im generally involves comparing pixel values between the subject image si and the surrounding image. Consequently, a lower difference in pixel values between the subject image si and the surrounding image reduces the ability to detect the subject image si. Expanding the luminance gain of the captured image im and relaxing the threshold value improve the ability to detect the subject image si, but increases false positives. In response to such a phenomenon, the information processing device 10 with the configuration described above executes at least one of expanding the luminance gain or relaxing the threshold value only in an area where a subject is highly likely to exist on the basis of a distance distribution. Therefore, the information processing device 10 may have improved ability to detect the subject image si while suppressing false positives in detecting the subject image si. Consequently, the information processing device 10 may have improved ability to detect the subject image si while suppressing false positives in detecting the subject image si, even in situations of reduced ability to detect the subject image si. Such situations may include situations with dark surroundings, such as at night, and under adverse weather conditions, such as in the rain.

The information processing device 10 according to the present embodiment creates the object-specific area frame sf to surround the subject image si through subject image detection in the captured image im. The information processing device 10 calculates the distance of a subject on the basis of corresponding directions in the distance distribution within the object-specific area frame sf. In distance detection by the distance measurement sensor 18, the accuracy of angles associated with distance values is relatively low in general. Therefore, as an example, consider a configuration that calculates the distance of a subject on the assumption that a single subject exists for a direction group corresponding to a distance value group in which the distance values differ by a predetermined value or less and the corresponding directions are close to each other. In this configuration, if some of the plurality of directions facing the subject are off due to error, the distance value corresponding to another direction between the erroneous directions may be omitted from the distance value group. In response to such a phenomenon, the information processing device 10 with the configuration described above reduces the influence of such omission. Therefore, the information processing device 10 may have improved distance calculation accuracy.

Figure 6:
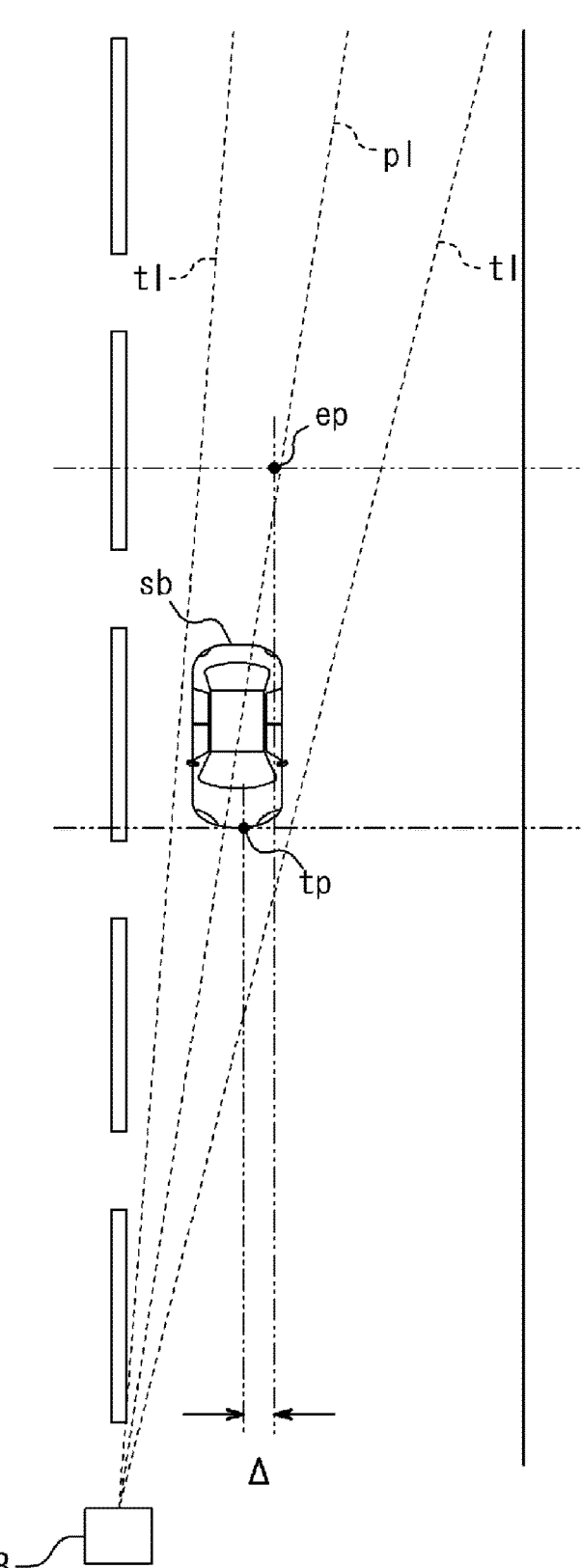
FIG. 6 is an overhead view of a real space corresponding to the captured image in FIG. 4, indicating trails of points corresponding in a real space to partial frame lines forming the object-specific area frame in FIG. 4.

The information processing device 10 according to the present embodiment calculates the position in the width direction on the basis of the object-specific area frame sf and the distance of the subject calculated on the basis of corresponding directions in the distance distribution within the object-specific area frame sf. To explain the effect of this configuration, the following describes subject distance calculation using the object-specific area frame sf. Two lines parallel to the second direction of the object-specific area frame sf correspond to the vertical direction in the real space and are represented as points. The two lines in the captured image im are represented as straight trails of points in the real space. As illustrated in FIG. 6, the two lines correspond to two straight tangent lines tl which extend from the distance measurement sensor 18 and which are tangent to each of the two ends of a subject sb in the width direction as seen from the distance measurement sensor 18. Therefore, the position of any point on a line segment connecting the intersection points between a line parallel to the width direction that passes through the subject sb in the depth direction of the real space and the two tangent lines tl, for example, the position of the midpoint, can be calculated as the position of the subject sb in the width direction. The depth direction is the direction perpendicular to the width direction in the plane that is perpendicular to the vertical direction in the real space. In such a method of calculating position in the width direction, at least one of the two tangent lines tl is inclined relative to the depth direction. Therefore, any error in the position in the depth direction of the subject sb in the real space will also produce error in the position in the width direction. As an example, consider a configuration that calculates the intersection point between a parting line pl and a line parallel to the width direction in the real space as the position of the subject sb in the width direction. In this configuration, an error A occurs between an error position ep calculated when the position of the line parallel to the width direction is off the subject sb and a true position tp calculated when the position of the line parallel to the width direction overlaps the subject sb. The parting line pl corresponds in the real space to a center line cl passing through the midpoint between the intersection points of the straight lines at each of the two ends, in the first direction, of the object-specific area frame sf in the captured image im and a line extending in the first direction, as illustrated in FIG. 4. In particular, in position recognition in the captured image im, a shift of the same length in the first and second directions in the captured image im causes a larger shift in the depth direction than in the width direction in the real space. Therefore, in a situation of reduced detection accuracy for the subject image im as described above, if error occurs in the position of the lines on the second-direction side of the object-specific area frame sf, a large error A may also occur in the position of the subject sb in the width direction. In response to such a phenomenon, the information processing device 10 with the configuration described above uses a distance of the subject sb that is based on a distance distribution with high detection accuracy. Therefore, the information processing device 10 has improved accuracy in calculating the position of the subject sb in the width direction using the object-specific area frame sf.

The foregoing describes an embodiment according to the present disclosure on the basis of the drawings and examples, but note that a person skilled in the art could easily make various variations or revisions on the basis of the present disclosure. Consequently, it should be understood that these variations or revisions are included in the scope of the present disclosure. For example, the functions and the like included in each component, each step, and the like may be rearranged in logically non-contradictory ways, and it is possible to combine a plurality of components, steps, or the like into one or divide a component, step, or the like.

For example, in the present embodiment, the information processing device 10 is to be applied to the roadside unit 11, but the information processing device 10 is not limited to such a configuration. For example, the information processing device 10 may also be installed in a vehicle or the like.

In the present disclosure, qualifiers such as "first" and "second" are identifiers for distinguishing configurations. The numerals denoting the configurations distinguished by qualifiers such as "first" and "second" in the present disclosure can be interchanged. For example, the first direction can interchange the identifiers "first" and "second" with the second direction. The identifiers are interchanged at the same time. The configurations are still distinguished after the interchange of the identifiers. The identifiers may be removed. The configurations with the identifiers removed therefrom are distinguished by signs. The description of identifiers such as "first" and "second" in the present disclosure shall not be used as a basis for interpreting the order of the configurations or inferring the existence of an identifier with a smaller number.

Many aspects of the content of the present disclosure are illustrated as a series of operations to be executed by a computer system or other hardware capable of executing program instructions. The computer system or other hardware includes, for example, a general-purpose computer, a personal computer (PC), a special-purpose computer, a workstation, a personal communications system (PCS), a mobile (cellular) phone, a mobile phone with data processing functions, an RFID receiver, a game console, an electronic notepad, a laptop computer, a Global Positioning System (GPS) receiver, or some other programmable data processing device. Note that in each embodiment, various operations are performed by a dedicated circuit (for example, individual logic gates interconnected to perform a specific function) implemented with program instructions (software), by a logic block or program module executed by at least one processor, or the like. The at least one processor that executes the logic block, program module, or the like includes, for example, at least one microprocessor, central processing unit (CPU), application-specific integrated circuit (ASIC), digital signal processor (DSP), programmable logic device (PLD), field-programmable gate array (FPGA), processor, controller, microcontroller, microprocessor, electronic device, or other device designed to execute the functions described herein, and/or a combination of any of the above. The embodiment illustrated herein is implemented by hardware, software, firmware, middleware, microcode, or a combination of any of the above. An instruction may be program code or a code segment for executing a required task. An instruction can be stored in a non-transitory machine-readable storage medium or other medium. A code segment may represent any combination of procedures, functions, subprograms, programs, routines, subroutines, modules, software packages, classes or instructions, data structures or program statements. A code segment transmits and/or receives information, a data argument, a variable, or stored content to and/or from another code segment or a hardware circuit, thereby connecting the code segment to the other code segment or hardware circuit.

Note that the description herein discloses a system having various modules and/or units to perform specific functions and schematically illustrates these modules and units to briefly describe the functionality thereof. However, it should be understood that the description here does not necessarily illustrate specific hardware and/or software. In that sense, these modules, units, and other components may be hardware and/or software implemented to substantially perform the specific functions described herein. The various functions of different components may be hardware and/or software in any combination or in isolation, and can be used separately or in any combination with each other. Input/output, or an I/O device or user interface, including but not limited to a keyboard, a display, a touch screen, a pointing device, and the like, can be connected to the system directly or through an intervening I/O controller. In this way, various aspects of the content of the present disclosure can be implemented in many different forms, and all such forms are to be included in the scope of the content of the present disclosure.

REFERENCE SIGNS 10 information processing device
11 roadside unit
12 detection device
13 memory
14 communicator
15 controller
16 detector
17 imaging device
18 distance measurement sensor
19 image interface
20 sensor interface
21 controller
22 memory
cl center line
el extension line
im captured image
ip intersection point
mp midpoint
pl parting line
sb subject
sf object-specific area frame
si subject image
tl tangent line
vl virtual line

The invention claimed is:

1. An information processing device comprising:
an image interface configured to acquire a captured image from an imaging device;
a sensor interface configured to acquire a distance distribution from a distance measurement sensor which has a detection range overlapping at least partially with an imaging range of the imaging device and which is configured to measure the distance distribution including distance values to a reflection point in each of a plurality of directions by receiving a reflected wave of a projected wave at an object; and a controller configured to detect a subject image from the captured image, calculate, on the basis of the captured image and the distance distribution, a position of a subject corresponding to the subject image in a width direction which is parallel to a horizontal direction and perpendicular to an optical axis direction of the imaging device, and prioritize use of the distance distribution to calculate a distance to the subject by changing a relative priority of the distance distribution to be used to calculate the distance to the subject according to a luminance of the captured image.

2. The information processing device according to claim 1, wherein the captured image includes at least one of a visible light image, a near-infrared image, or a far-infrared image, and the distance distribution includes a detection result from at least one of radar, sonar, or LiDAR.

3. The information processing device according to claim 1, wherein the controller is configured to identify, on the basis of the distance distribution, an area in the captured image where the subject image is highly likely to exist, and detect the subject image from the captured image after executing at least one of expanding a luminance gain of the captured image or relaxing a threshold value to be used to detect the subject image in the identified area.

4. The information processing device according to claim 3, wherein the controller is configured to identify, as the area where the subject image is highly likely to exist, an area in the captured image that corresponds to a direction group corresponding to a distance value group from among the plurality of direction-specific distance values in the distance distribution, the distance value group containing distance values that differ by a predetermined value or less and having directions that are close to each other.

5. The information processing device according to claim 1, wherein the controller is configured to create an object-specific area frame to surround the subject image through subject image detection in the captured image, and calculate the distance of the subject on the basis of corresponding directions in the distance distribution within the object-specific area frame.

6. The information processing device according to claim 5, wherein the controller is configured to calculate the position in the width direction on the basis of the object-specific area frame and the distance of the subject.

7. A vehicle comprising:

an imaging device configured to generate a captured image;

a distance measurement sensor which has a detection range overlapping at least partially with an imaging range of the imaging device and which is configured to generate a distance distribution including distance values to a reflection point in each of a plurality of directions by receiving a reflected wave of a projected wave at an object; and a controller configured to detect a subject image from the captured image, calculate, on the basis of the captured image and the distance distribution, a position of a subject corresponding to the subject image in a width direction which is parallel to a horizontal direction and perpendicular to an optical axis direction of the imaging device, and prioritize use of the distance distribution to calculate a distance to the subject by changing a relative priority of the distance distribution to be used to calculate the distance to the subject according to a luminance of the captured image.

8. A roadside unit comprising:

an imaging device configured to generate a captured image;

a distance measurement sensor which has a detection range overlapping at least partially with an imaging range of the imaging device and which is configured to generate a distance distribution including distance values to a reflection point in each of a plurality of directions by receiving a reflected wave of a projected wave at an object; and a controller configured to detect a subject image from the captured image, calculate, on the basis of the captured image and the distance distribution, a position of a subject corresponding to the subject image in a width direction which is parallel to a horizontal direction and perpendicular to an optical axis direction of the imaging device, and prioritize use of the distance distribution to calculate a distance to the subject by changing a relative priority of the distance distribution to be used to calculate the distance to the subject according to a luminance of the captured image.

9. An information processing method comprising:

generating a captured image;

generating a distance distribution including distance values to a reflection point in each of a plurality of directions by receiving a reflected wave of a projected wave at an object in a detection range that overlaps at least partially with a range of the captured image;

detecting a subject image from the captured image;

calculating, on the basis of the captured image and the distance distribution, a position of a subject corresponding to the subject image in a width direction which is parallel to a horizontal direction and perpendicular to an optical axis direction of an imaging device configured to generate the captured image; and calculating a distance to the subject by prioritizing use of the distance distribution by changing a relative priority of the distance distribution to be used to calculate the distance to the subject according to a luminance of the captured image.

10. The information processing device according to claim 1, wherein the controller is configured to change the relative priority by changing the weighting of the distance distribution to be used to calculate the distance to a subject according to the luminance of the captured image.

11. The vehicle according to claim 7, wherein the controller is configured to change the relative priority by changing the weighting of the distance distribution to be used to calculate the distance to a subject according to the luminance of the captured image.

12. The roadside unit according to claim 8, wherein the controller is configured to change the relative priority by changing the weighting of the distance distribution to be used to calculate the distance to a subject according to the luminance of the captured image.

13. The information processing method according to claim 9, wherein the calculating the distance changes the relative priority by changing the weighting of the distance distribution to be used to calculate the distance to a subject according to the luminance of the captured image.

14. The information processing device according to claim 1, wherein the controller is configured to execute at least one of expanding a luminance gain or relaxing a threshold value only in an area where a subject is highly likely to exist on the basis of a distance distribution.

15. The roadside unit according to claim 8, wherein the controller is configured to execute at least one of expanding a luminance gain or relaxing a threshold value only in an area where a subject is highly likely to exist on the basis of a distance distribution.

16. The information processing method according to claim 9, further comprising:

executing at least one of expanding a luminance gain or relaxing a threshold value only in an area where a subject is highly likely to exist on the basis of a distance distribution.

\* \* \* \* \*